No. 829,201. PATENTED AUG. 21, 1906.
L. GODDU.
ENGINE OR MOTOR.
APPLICATION FILED MAY 24, 1902.

Witnesses.
C. H. Gannett
J. Murphy

Inventor
Louis Goddu
by Jas. H. Churchill
Atty.

Fig. 2.

No. 829,201. PATENTED AUG. 21, 1906.
L. GODDU.
ENGINE OR MOTOR.
APPLICATION FILED MAY 24, 1902.

Witnesses.
C. H. Gannett
J. Murphy

Inventor:
Louis Goddu
By Jas. H. Churchill
atty.

No. 829,201. PATENTED AUG. 21, 1906.
L. GODDU.
ENGINE OR MOTOR.
APPLICATION FILED MAY 24, 1902.

Witnesses.
C. H. Gannett
J. Murphy.

Inventor:
Louis Goddu
by Jas. H. Churchill
Atty.

UNITED STATES PATENT OFFICE.

LOUIS GODDU, OF WINCHESTER, MASSACHUSETTS.

ENGINE OR MOTOR.

No. 829,201.　　　Specification of Letters Patent.　　Patented Aug. 21, 1906.

Application filed May 24, 1902. Serial No. 108,871.

*To all whom it may concern:*

Be it known that I, LOUIS GODDU, a citizen of the United States, residing in Winchester, in the county of Middlesex, State of Massachusetts, have invented an Improvement in Engines or Motors, of which the following description, in connection with the accompanying drawings, is a specification, like characters on the drawings representing like parts.

This invention relates to an engine or motor especially adapted to be employed to propel an automobile-vehicle; and has for its object to provide a simple, cheap, and highly-efficient engine or motor of novel construction which may be supported at one end upon the driven shaft or axle and which may be rotatively connected at its other end to the vehicle-body, so as to form the front support for said body, and yet permit the shaft or axle to be turned in the act of steering the vehicle.

The invention further has for its object to provide an engine or motor with which naphtha, gasolene, or like fluid may be used with safety.

Another feature of the invention consists in a novel construction of driving mechanism and of a power and speed changing mechanism whereby the power of the engine and speed of the vehicle may be regulated as desired, the driving mechanism permitting the engine or motor to be run while the vehicle is at rest.

These and other features of this invention will be pointed out in the claims at the end of this specification.

Figure 4:
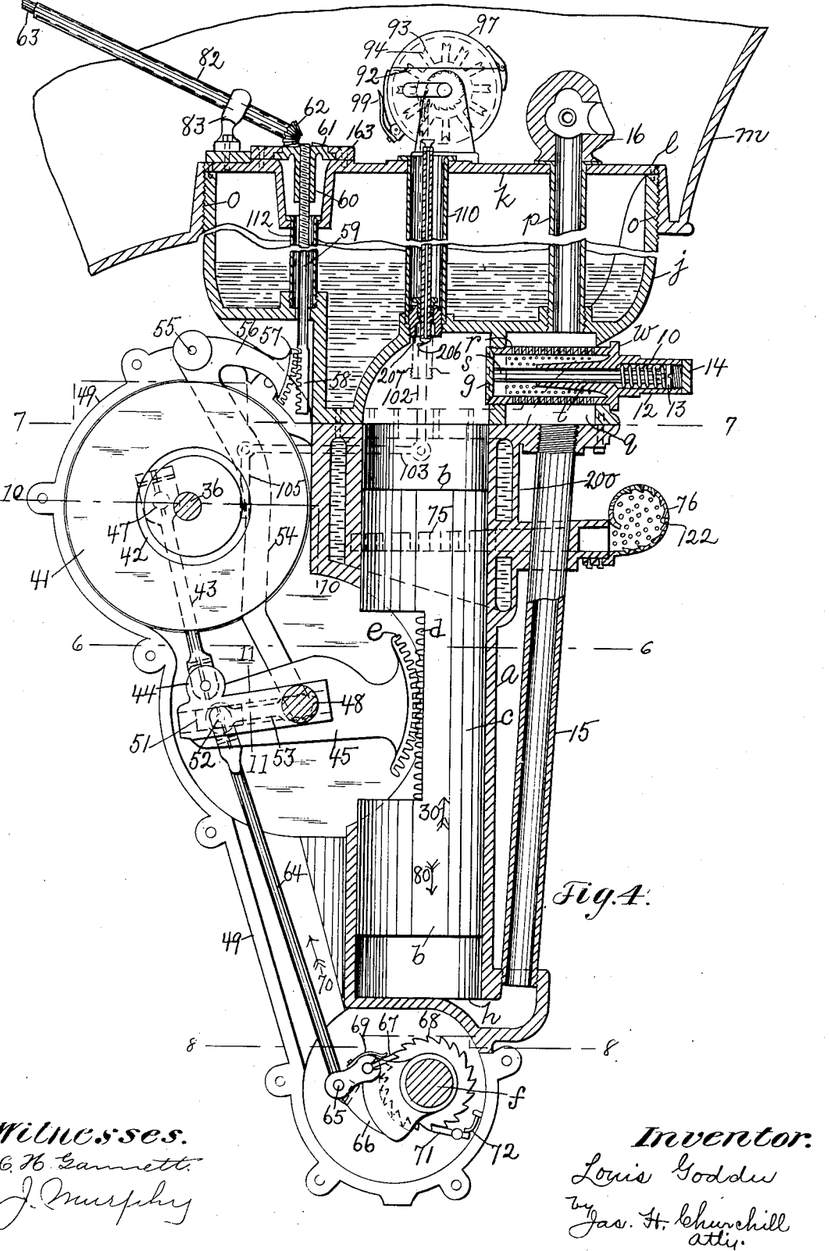
Fig. 4, a vertical section, on an enlarged scale, of the engine or motor shown in Fig. 1, the section being taken on the line 4 4, Fig. 3.

Referring to Fig. 4, *a* represents a cylinder in which is located a reciprocating piston, preferably made as herein shown and consisting of two cylindrical heads or ends *b* of the diameter of the cylinder and an intermediate portion *c* of reduced area in cross-section and practically forming a piston-rod. The piston-rod *c* is provided with a substantially straight face having rack-teeth *d* located in substantially the longitudinal center of the piston and which are engaged by a toothed segment *e*, forming part of the driving mechanism for the shaft *f*, which latter may be the front axle of the vehicle. The cylinder *a* is provided at one end with a port having coöperating with it a valve *g* for a purpose as will be described, and at its opposite end the said cylinder is provided with an open port *h*.

The cylinder *a* in the present instance is secured to or forms part of an enlarged vessel *j*, adapted to contain water or other cooling medium and which will be hereinafter referred to as the "water cylinder or pot," which is normally closed by a cover *k*, secured liquid-tight by screws *l* or in any other suitable manner. The water-cylinder *j* communicates, through suitable ports, with a water-jacket 200, surrounding the upper portion of the cylinder *a*.

The water cylinder or pot *j* is rotatably attached to the front portion *m* of the body *n* of the vehicle, and for this purpose the said cylinder, as shown, is provided on its exterior with screw-threads *o*, which engage a threaded socket in the under side of the front portion *m* of the vehicle-body.

Figures 5, 6:
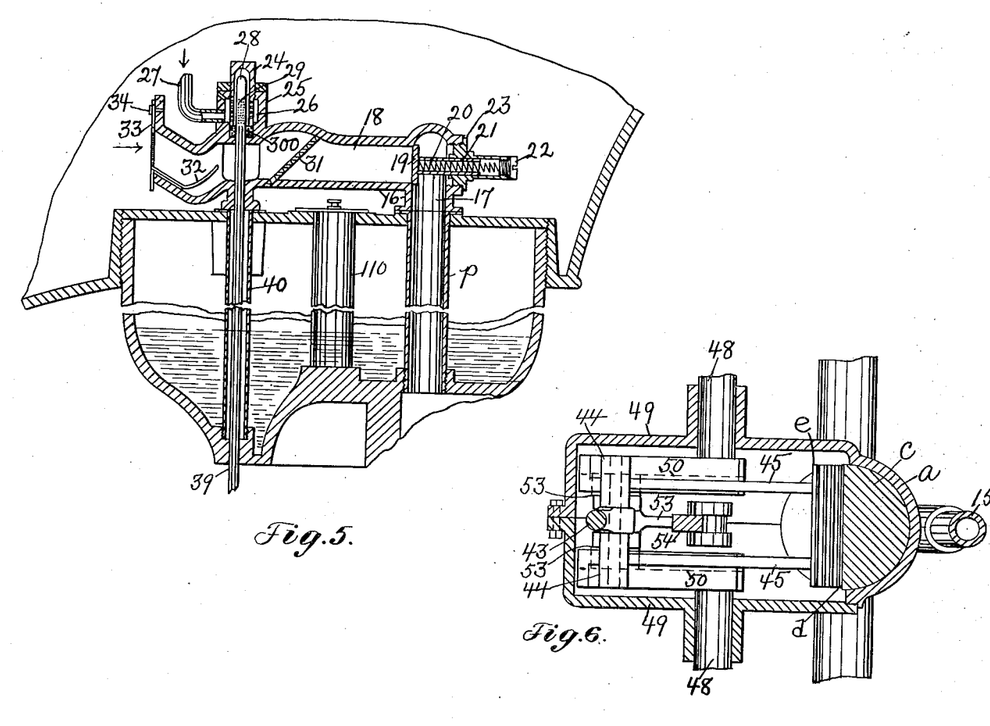
Figs. 5 and 6, sectional details to be referred to, Fig. 5 being taken on the line 5 5, Fig. 3, and Fig. 6 on the line 6 6, Fig. 4.

The water cylinder or pot *j* has extended through it a tube or pipe *p*, which communicates at its lower end with a chamber *q*, which may be designated a "mixing-chamber," and for the best results said chamber contains a perforated tube *r*, fitted into the cylinder *a* and forming a seat for the valve *g*, which latter is provided with a stem or rod *s*, extended through a bearing tube or sleeve *t*, which, as shown, forms an integral part of the perforated tube *r* and of the head *w* for the chamber *q*. The valve *g* is normally held to its seat by a spiral spring 10, located in a hollow extension 12 of the head *w* and bearing at one end against the said head and at its opposite end against a head 13 on the valve-rod. The hollow extension 12 is closed by a cap or plug 14. The mixing-chamber $q$ is connected by a pipe 15 with the port $h$ of the cylinder $a$. The tube $p$ communicates above the water pot or cylinder $j$ with a pipe or hollow casting 16, (see Fig. 5,) bolted or otherwise secured to the cover $k$ and provided, as herein represented, with a vertical passage 17 and with a horizontal passage 18, between which is interposed a valve 19, which is normally seated by a spring 20, located in the hollow stem 21 of said valve and bearing against a cap 22 on the hollow extension of a nut 23. The passage 18 communicates at its end with the atmosphere, and intermediate said end and the valve 19 the said passage communicates with an oil-supply cylinder 24, preferably made as herein shown, and consisting of a hollow nut which engages a threaded opening in a boss 25 of the horizontal pipe 18, the front end of the cylinder or nut 24 being reduced in diameter to leave between it and the boss 25 an oil chamber or space 26, which is filled with gasolene, naphtha, or like oil from a supply-pipe 27, which leads to a suitable tank or other source of supply carried by the vehicle and not herein shown. The chamber 26 communicates with the cylinder or nut 25 through perforations in the walls of the latter.

In order to supply a predetermined quantity of oil for each explosive charge, I have provided a piston which reciprocates in the cylinder or nut 24 and which may and preferably will be made as herein shown, it consisting of a cylindrical rod 28, having one or more cavities or pockets 29 formed in its circumference, which are filled with oil and which carry the oil in them into the pipe or passage 18, where the oil is dislodged from the said pockets or cavities by the air drawn into the said passage, which takes place when the engine-piston $b$ moves upward or in the direction indicated by the arrow 30 in Fig. 4. The piston-rod 28 is rendered liquid-tight by means of suitable packing 300, which prevents the oil in the cylinder being admitted into the air-passage 18 except such as is carried into the passage 18 in the pockets or cavities 29.

The oil dislodged from the piston 28 by the air is preferably projected against an obstruction in the passage 18, which obstruction is shown as a perforated plate or division-wall 31 and which acts to shatter the oil and gasify the same. The quantity of air admitted into the passage 18 may be regulated by a suitable damper or device, which may be made as herein shown and which consists of a curved plate or arm 32, extended into the passage 18 and attached to a slide or plate 33, adjustably secured to the outside of the pipe, as by a screw 34.

The piston 28, with its pockets 29, constitutes an oil-carrier and may be operated, as herein shown, (see Figs. 2 and 10,) by a cam shown as a cam-groove 340 in the side or face of a balance wheel or disk 35, fast on a shaft 36. The cam 340 actuates one arm 37 of an elbow-lever, having its other arm 38 connected to the lower end of the rod 39 of the oil piston or carrier, which rod is represented as of the same diameter as the oil-carrier and as integral with it. The piston-rod 39 moves in a surrounding tube or pipe 40, extended through the water cylinder or pot $j$. The cam 340 is properly shaped and timed so as to move the oil-carrier into the air-passage 18 at or about the time the engine-piston $b$ is beginning its upstroke in the direction indicated by the arrow 30.

The shaft 36 has fast on it a second balance or fly wheel 41, (see Figs. 4 and 10,) provided with a cam-groove 42, which operates an igniter, preferably of the construction herein shown and as will be described.

Figures 9, 11:
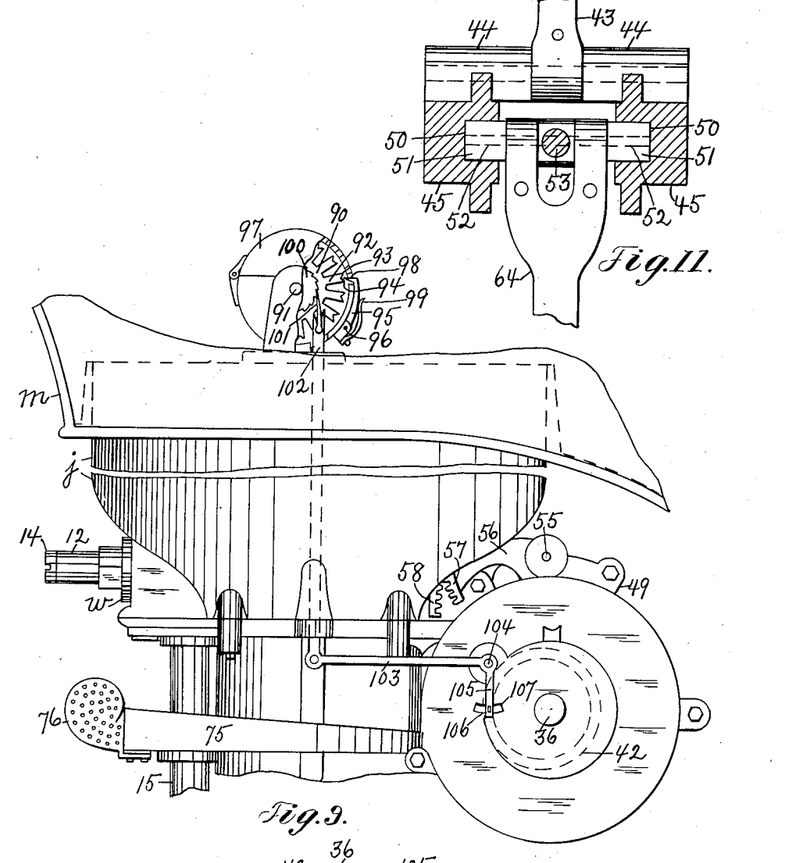
Fig. 9, a detail in side elevation with parts broken away.
Fig. 11 a section, on an enlarged scale, taken on the line 11 11, Fig. 4, looking toward the left.
Figure 10:
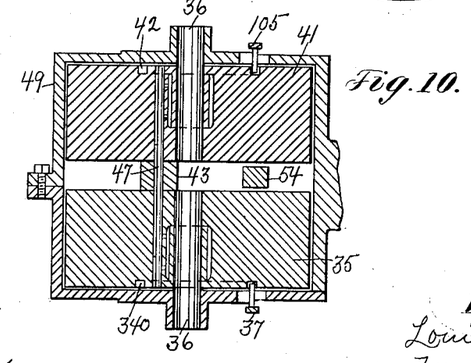
Fig. 10, a sectional detail on the line 10 10, Fig. 4.

The balance-wheels 35 41 are connected by a link or rod 43 to lugs or ears 44 on an oscillating lever comprising the toothed segment $e$ and arms 45, extended therefrom. (See Figs. 6 and 11.) By preference the link or rod 43 is connected to a pin 47, which extends loosely into holes in the balance-wheels 35 41, as represented in Fig. 10.

Figure 8:
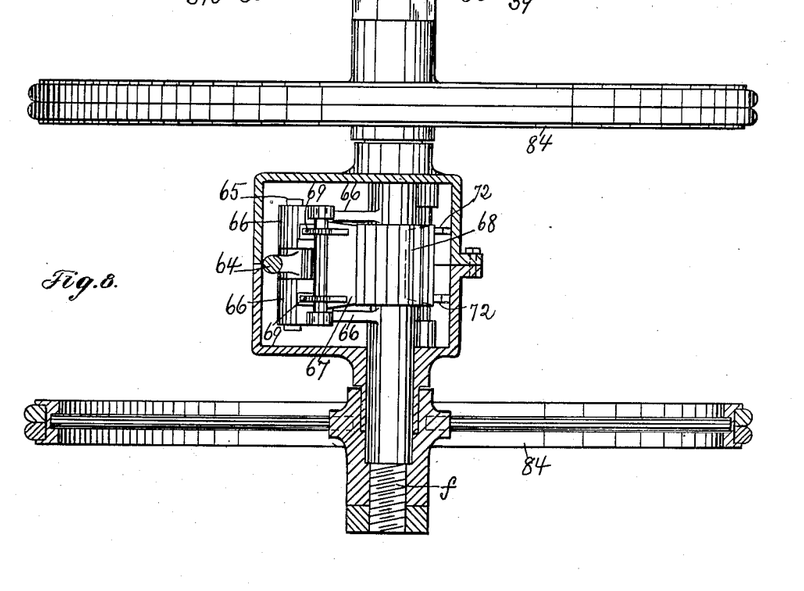
Fig. 8, a detail in section and elevation to be referred to, the section being taken on the line 8 8, Fig. 4.

The arms 45 have secured to them stub-shafts 48, (see Fig. 6,) supported in suitable bearings in an inclosing case 49, comprising two parts suitably bolted or otherwise secured together. The arms 45 are also provided with longitudinal slots or guideways 50, extended from substantially their center to near the end opposite the toothed segment $e$, (see Fig. 4,) in which slots are adapted to slide suitable bearing-blocks 51 for a shaft or pin 52, joined by a link 53 to one end of an elbow-lever 54, pivoted, as at 55, to the inclosing case 49 and having its shorter arm 56 provided with a toothed segment 57, which engages a toothed portion or rack 58 of a rod 59, provided with suitable screw-threads at its upper end which are engaged by the threaded hub 60 of a bevel-gear 61, with which meshes a bevel-gear 62 on a shaft or rod 63. The gear 61, as shown, turns on the cover $k$ and is secured against vertical movement by means of a clamping ring or collar 163, screwed or otherwise fastened to the said cover. The pin or shaft 52, mounted in the sliding blocks 51, has connected to it between the arms 45 of the oscillating lever a link or connecting rod 64, (see Figs. 4 and 11,) which is connected at its lower end by a pin 65 to cranks or arms 66, (see Fig. 8,) loosely mounted on the driven shaft $f$, shown in the present instance as the front axle of the vehicle. The cranks or arms 66 have pivoted in them a pawl 67, which coöperates with a ratchet-wheel 68 fast on the shaft $f$, the said pawl being held in engagement with the teeth of the ratchet-wheel by a spring 69. The movement of the connecting-rod 64 in the direction indicated by the arrow 70 (see Fig. 4) causes the ratchet-wheel 68 to be rotated the distance of a predetermined number of teeth, and on the return movement of the rod 64 the pawl is carried back and engaged with a new tooth ready for a new stroke The ratchet-wheel 68 and the shaft $f$ are locked against backward rotation by means of a holding-pawl 71, held in engagement with the teeth of the ratchet-wheel by a suitable spring 72. By means of the elbow-lever 54 the sliding blocks 51, to which the link 53 is pivotally connected, are capable of being moved toward and from the center of the oscillating lever 45 to vary the power of the engine applied to the driven shaft, and consequently vary the speed at which the vehicle is driven.

In operation a charge of naphtha or other light oil is conveyed by the oil-carrier 28 into the air-passage 18, where it meets a current of incoming air which forces the oil out of the cavities 29 in the carrier and against the obstructor or perforated plate 31.

The gas formed is drawn down through the passages 18 17 and pipe $p$ into the mixing-chamber $q$, and the valve $g$ being closed the mixture of air and gas is carried down through the pipe 15 into the lower part of the cylinder $a$ by the movement of the piston $b$ in the direction indicated by the arrow 30—namely, on its up movement—the lower head of the engine-piston having in this case the functions of the piston of an air-pump.

Figure 7:
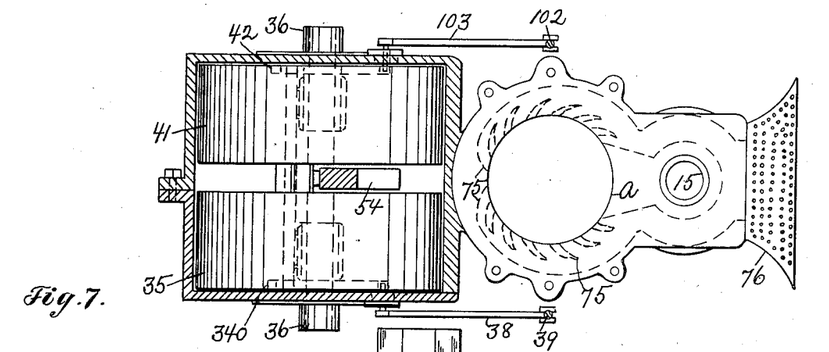
Fig. 7, a sectional detail, on an enlarged scale, taken on the line 7 7, Fig. 4.

The valve 19 (shown in Fig. 5) is automatically opened by the suction created by the piston $b$ on its up movement. When the piston $b$ commences its downstroke, the valve 19 is closed and the mixture of gas and air in the lower portion of the cylinder $a$ is forced back through the pipe 15 into the mixing-chamber $q$ and passes through the perforations in the mixing tube or cylinder $r$, being compressed therein until the piston $b$ on its downstroke uncovers a series of exhaust-ports 75 in opposite sides of the cylinder $a$, as represented in Fig. 7.

The exhaust-ports 75 communicate with the atmosphere through a muffler 76 of a special construction, as will be described. As soon as the piston $b$ has moved so as to partially uncover the exhaust-ports 75 the pressure of the gas in the mixing-chamber $q$ forces open the valve $g$ and the mixture of gas and air rushes into the cylinder $a$ above the piston, thereby driving out any foul gases which may remain from a previous explosion.

At or about the time the piston $b$ has completed its downstroke the upper part of the cylinder $a$ is filled with a fresh explosive mixture of gas and air and the piston $b$ commences its upstroke—namely, in the direction indicated by the arrow 30.

At the beginning of the upstroke the gas-inlet valve $g$ is closed and the valve 19 in the passage 17 is opened, thereby permitting a fresh supply of gas and air to be drawn into the lower part of the cylinder $a$.

The mixture of gas and air admitted into the upper part of the cylinder $a$ is compressed on the upstroke of the piston, which in this case has the functions of a compressor, and at or about the end of its upstroke in the direction indicated by the arrow 30 the said mixture is exploded, preferably, by a spark produced from an igniter. The exploded mixture drives the piston $b$ down or in the direction indicated by the arrow 80 and stores up in the mixing-chamber $q$ a fresh charge of gas and air under pressure until the exhaust-ports 75 are uncovered by the piston, whereupon the operation just described is repeated. The action of the igniter and of the oil-carrier is controlled, as previously described, by the cams in the balance-wheels, which are so shaped and timed as to effect their respective functions in the proper sequence.

As previously described, the movement of the piston in one direction—namely, its downward direction—is communicated to the shaft $f$ through the driving mechanism, previously described, and a partial rotation of the said shaft is effected. On the reverse movement of the piston the push-pawl 67 is carried back, so as to engage a new tooth of the ratchet-wheel ready to continue the movement of the shaft on the next downstroke of the piston. The movement of the piston is so repeated as to produce practically a continuous rotation of the driven shaft, and the movement of the driven shaft is regulated by the balance-wheels, so as to effect a smooth continuous movement.

In the present instance provision is made for turning the driven axle or shaft by means of handles 81, attached to the hollow shaft or rod 82, connected with an upright 83, suitably secured to the cover $k$. This rotation of the engine is permitted by means of the screw-threads on the pot or cylinder $j$ engaging the screw-threaded portion of the wagon-body. The shaft $f$ is substantially short and has mounted upon it the front wheels 84, (shown in Fig. 8,) which are located but a substantially short distance apart.

The igniter may and preferably will be made as herein shown and consists of a rotatable member comprising a disk 90, (see Figs. 4 and 9,) mounted on a shaft 91 and provided with a series of radiating spokes or arms 92, each of which is notched at its end to form two contact-points 93 94, with which coöperate a contact member, preferably made as herein shown and comprising a pawl or arm 95, pivoted at 96 to the outside of a two-part case 97, inclosing said rotatable member and having a finger 98 extended through a slot in said case and into the path of movement of the contact-points 93 94.

The finger 98 is held in yielding engagement with the contact-points by a spring 99.

The shaft 91 has fast on it a ratchet-wheel 100, which is engaged by a pawl 101, pivoted in the upper end of a rod 102, extended down through the water pot or cylinder $j$ and connected to the long arm of an elbow-lever 103, pivoted at 104 to the outside of the casing and having its short arm 105 provided with a stud or projection 106, extended through a slot 107 in the casing and into engagement with the cam 42.

By reference to Fig. 9 it will be seen that the ratchet-wheel 100 is rotated by the upward movement of the pawl 101, effected by the cam 42 operating on the elbow-lever, and that a contact arm or spoke 92 is moved past the contact-finger 98 for each revolution of the shaft 36. It will be seen that as the arm or spoke 92 is moved past the contact-finger 98 the circuit including these parts is completed and opened twice substantially in an instant, thus causing a spark to be twice formed in rapid sequence within the cylinder $a$ between the terminals or points 206 207 shown in Fig. 4, and consequently insuring explosion of the charge within the cylinder. In practice the contact member or pawl 95 and the rotatable member 90 are included in circuit with the primary of an induction-coil, and the terminals 206 207 are included in the secondary of said coil in a manner well understood, but not herein shown.

The igniter is inclosed within a tube 110, extended through the water-pot, and the speed-changing rod 59 is likewise protected by a tube 112 from the influence of the water. The water-pot $j$ and the jacket 200 serve to keep cool the explosive-chamber of the engine.

By reference to Fig. 4 it will be seen that rotation of the shaft 63 produces rotation of the gears 62 61, which causes longitudinal movement of the rack-bar 58, thereby through the toothed segment 57 turning the elbow-lever 54 on its pivot, so as to move the sliding blocks 51 toward or from the center of the oscillating lever 45, according to the speed at which the vehicle is to be driven. By reference to Fig. 4 it will be seen that when the pin 52 is concentric with the shafts 48 oscillation of the lever 45 will not produce movement of the connecting-rod 64, and consequently the vehicle will remain stationary while the engine continues to run. By moving the pin 52 off from the center 48 motion is imparted to the link 64, and the shaft $f$ is set in motion with a maximum power and slow speed when the pin 52 is adjacent to the center 48 and with a maximum speed and diminished power with the pin 52 at the end of its movement away from the center 48.

The muffler 76 may be made as herein shown and consists of a box or casing having perforated side walls and a curved or snail-like intermediate wall, which latter is also provided with perforations, and on its inner surface said curved wall may be provided with corrugations or projections 122, (see Fig. 4,) which act to retard the passage of the exhaust through the muffler and direct it through the perforations in the curved wall of the said muffler.

The weight of the water in the water cylinder acts to steady the vehicle in its travel and to reduce the jar or vibration and further increases the traction of the front wheels. It is noted that in the construction herein shown the driving mechanism for the shaft $f$ is never on a dead-center.

Figure 1:
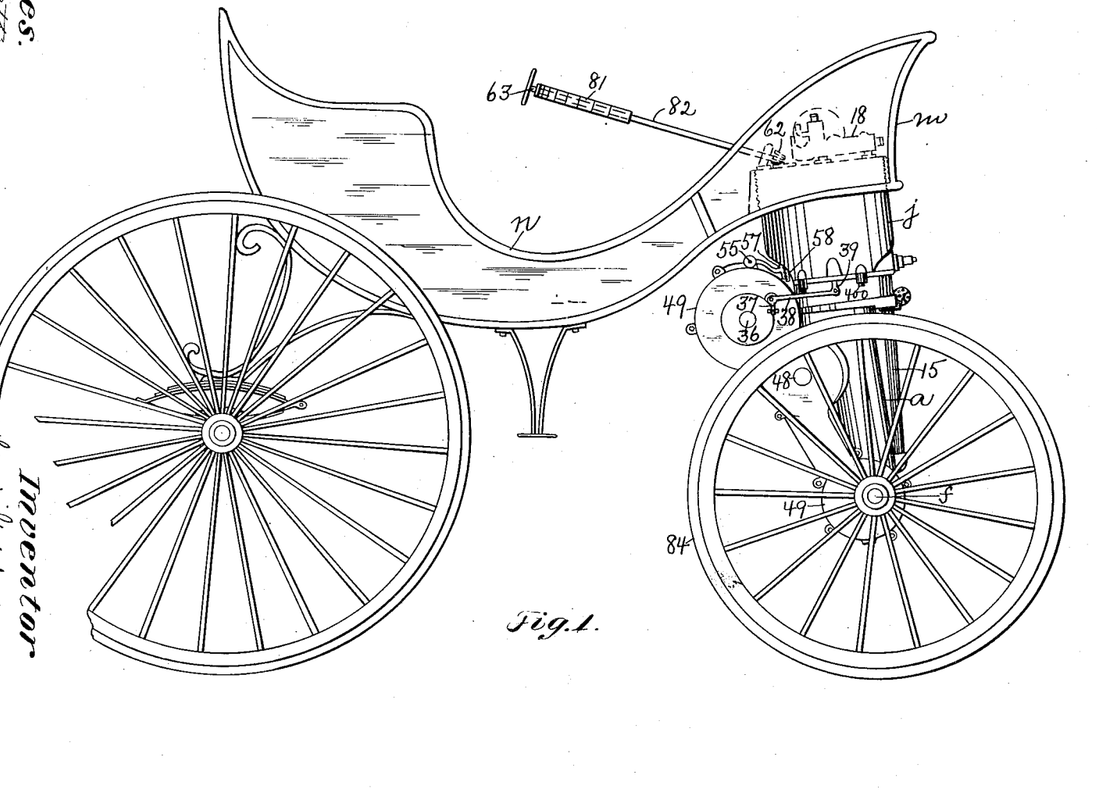
Figure 1 is a side elevation of one form of automobile-vehicle embodying this invention.
Figure 2:
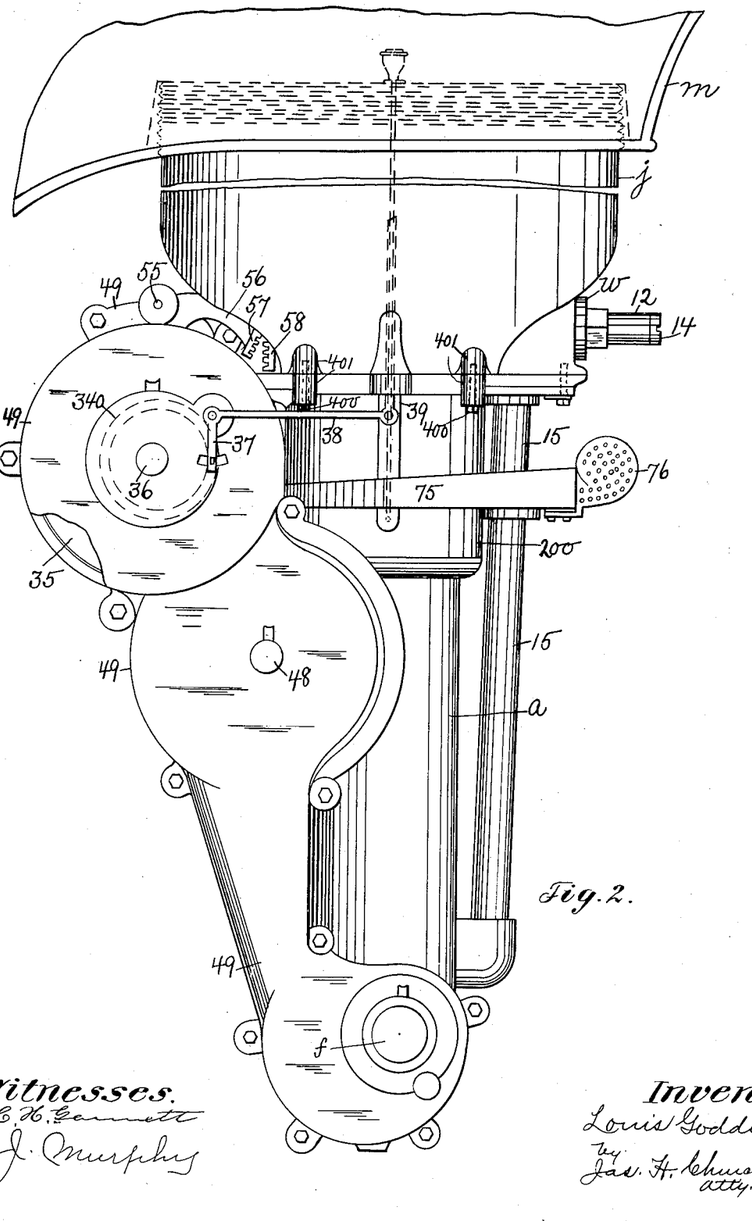
Fig. 2, a side elevation, on an enlarged scale, of the engine or motor shown in Fig. 1.
Figure 3:
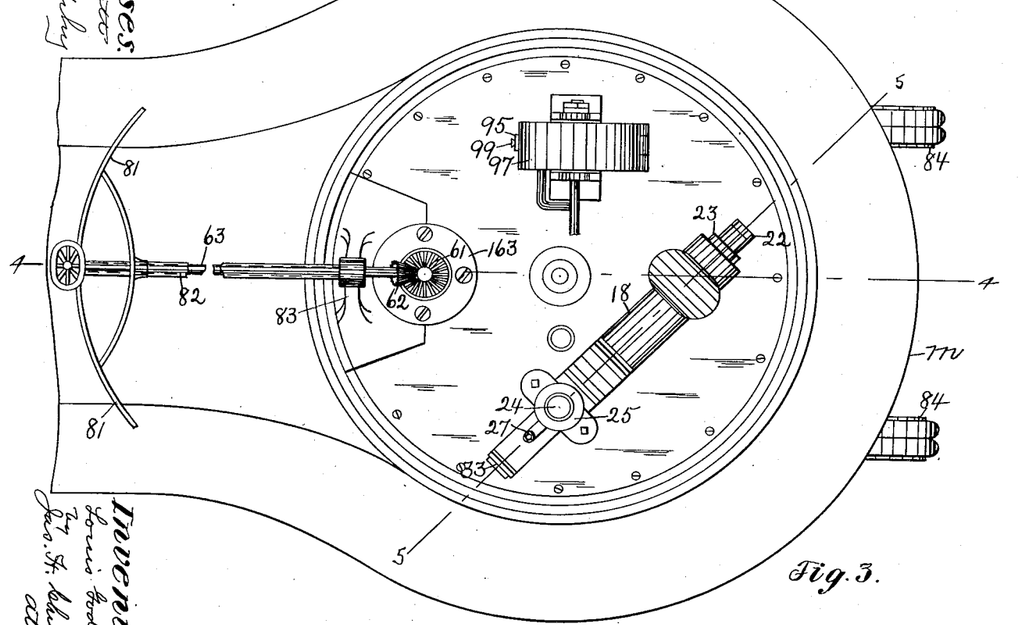
Fig. 3, a detail in plan of the front portion of the vehicle shown in Fig. 1.

The water cylinder or pot $j$ is recessed on its under side to form part of the engine-cylinder, as shown in Fig. 4, and the said pot and engine-cylinder are secured together by suitable screws or bolts 400, extended through suitable bosses 401 on the outside of of the water-pot and engine-cylinder, as shown in Figs. 1 and 2.

I claim—

1. The combination with an engine or motor, of a shaft to be driven thereby, mechanism connecting said engine with said shaft, and comprising an oscillating lever, means for engaging said shaft, and a link or rod connected with said means, and mechanism connecting said link with said lever and having provision for moving the link concentric with the pivot for said lever, and means to effect movement of the said mechanism toward and from the pivot for said oscillating lever, substantially as described.

2. The combination with an engine or motor, of a shaft to be driven thereby, mechanism connecting said engine with said shaft, and comprising an oscillating lever, means for engaging said shaft, and a link or rod connecting said means and said lever, and means to effect movement of the link toward and from the pivot for said oscillating lever, said means comprising a link, an elbow-lever provided with a toothed segment, a rack-bar in engagement with said segment, and means to reciprocate said rack-bar, substantially as described.

3. The combination with an engine comprising a cylinder provided with ports near its opposite ends and having an opening intermediate said ports, a piston provided with heads at its opposite ends and with a toothed portion intermediate said heads, an oscillating lever having a toothed segment in engagement with the toothed portion of said piston, a shaft to be driven, and means connecting said oscillating lever with said shaft, substantially as described.

4. The combination with an engine comprising a cylinder having an opening, a piston provided with a toothed portion, an oscillating lever having a toothed segment in engagement with the toothed portion of said piston, a shaft to be driven, means connecting said oscillating lever with said shaft, and means to vary the effect of the oscillation of said lever on said shaft, substantially as described.

5. The combination with an engine or motor comprising a cylinder, a piston reciprocating therein, an oscillating lever operatively connected with said piston, a balance-wheel, a link connecting said lever with said balance-wheel, a shaft, a link having one end operatively connected with said shaft and its other end in sliding engagement with said oscillating lever, and means to move said link on said lever toward and from the center or pivot of the same, substantially as described.

6. The combination with a shaft to be driven, of an engine or motor comprising a cylinder and a piston reciprocating therein, and mechanism connected with the exterior of said piston intermediate of its ends and with said shaft to be driven for transmitting the motion of said piston to the said driven shaft said mechanism having provision for varying the speed of rotation of said shaft, substantially as described.

7. The combination with an engine or motor comprising a cylinder and a piston, of an oscillating lever connected with said piston, a shaft to be driven, mechanism for connecting said oscillating lever with said shaft and movably engaged with said oscillating lever, and means for moving said connecting mechanism toward and away from the center of said oscillating lever, substantially as described.

8. The combination with an engine or motor comprising a cylinder and a piston, of an oscillating lever connected with said piston, a shaft to be driven, mechanism for connecting said oscillating lever with said shaft and movably engaged with said oscillating lever, and means for moving said connecting mechanism toward and away from the center of said oscillating lever, said means comprising an elbow-lever provided with a toothed segment, a rack-bar in engagement with said toothed segment and provided with screw-threads, a beveled gear in engagement with the screw-threaded portion of the said rack-bar, and means for rotating said bevel-gear, substantially as described.

9. The combination with an engine or motor comprising a cylinder and a piston reciprocating therein, an oscillating lever or device connected with said piston to be oscillated thereby, balance wheels or disks, a crank-pin loosely inserted into holes in said balance-wheels, and a link or crank rod connecting said pin with said oscillating device or lever, substantially as described.

10. The combination with an engine or motor, of a shaft to be driven thereby, a ratchet-wheel fast on said shaft, a push-pawl engaging said ratchet-wheel, a holding-pawl in engagement with said ratchet-wheel, and means for connecting said push-pawl with said engine, substantially as described.

11. The combination with an engine or motor comprising a cylinder provided with an inlet-port at one end and with a water pot or cylinder at the opposite end which forms a head for said cylinder and is provided with an inlet-port for said cylinder, a piston in said cylinder, a gas-supply pipe extended through said water-pot and communicating with the opposite ends of said cylinder through said ports, a valve controlling the admission of gas into said supply-pipe, and a valve controlling the admission of gas from said supply-pipe into one end of said cylinder, substantially as described.

In testimony whereof I have signed my name to this specification in the presence of two subscribing witnesses.

LOUIS GODDU.

Witnesses:
    JAS. H. CHURCHILL,
    J. MURPHY.